Feb. 8, 1927.
A. G. PICKETT
PACKING
Filed Oct. 10, 1923
1,616,596
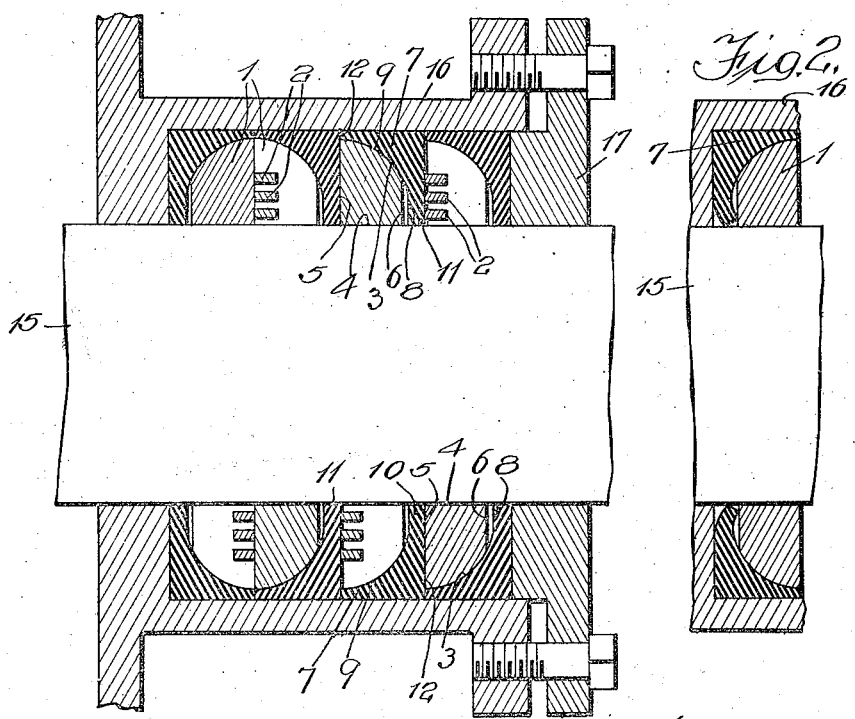
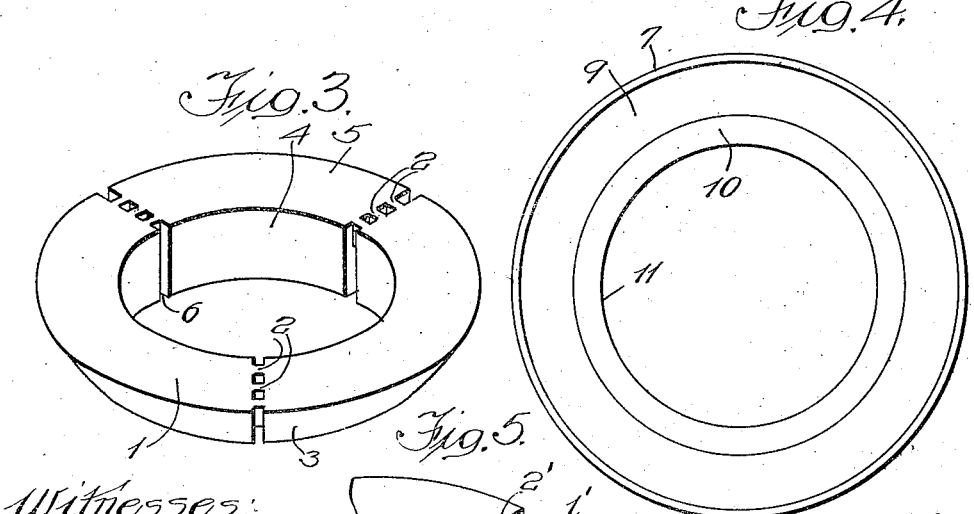
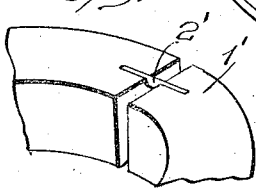
Witnesses:
W. F. Kilroy
Harry R. L. White
Inventor:
A. Glenn Pickett
By Nice & Nice Attys.

Patented Feb. 8, 1927.

1,616,596

UNITED STATES PATENT OFFICE.

A. GLENN PICKETT, OF CHICAGO, ILLINOIS, ASSIGNOR TO CHICAGO METALLIC PACKING COMPANY, OF CHICAGO, ILLINOIS, A CORPORATION OF ILLINOIS.

PACKING.

Application filed October 10, 1923. Serial No. 667,702.

My invention belongs to that general class of devices known as packing and relates more particularly to a metallic packing made up of metallic rings combined with cooperating rings or cups of suitable material.

The invention has among its objects the production of a packing of the kind described that is simple, durable, efficient, reliable and satisfactory for use wherever found applicable. It has particularly as an object the production of an improved packing which will be leak-proof immediately upon installation, without requiring more or less time to be worn in so that the metal elements seat perfectly on the rod. The same is particularly designed for use on reciprocating rods, although it is applicable on rotating rods as well. The same also has as an object the production of a packing which may be efficiently applied by one not particularly skilled in packing stuffing boxes and yet which will operate satisfactorily from the time of installation. It has also as its object the production of a packing which although tight and leak-proof, will be as frictionless as possible so as to avoid drag on the rod, particularly when going in the opposite direction to the power stroke. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a sectional view through a stuffing box showing my improved packing applied thereto;

Fig. 2 is a sectional view substantially illustrating a portion of the same;

Fig. 3 is a perspective view of one of the metallic rings;

Fig. 4 is a plan view of one of the backing cups; and

Fig. 5 is a perspective view of a portion of a metallic ring illustrating a slight modification.

Referring to the drawings, 1 represents a metal ring constituting a wear member of suitable metal, preferably a bearing metal such as babbitt or the like, made in the desired size and preferably in a plurality of sections. As shown in Figs. 1 and 3, the ring sections are connected together, as indicated at 2, by thin sections of the bearing metal. These sections should be of such thickness or size as to permit the contraction and seating of the ring when applied to the rod. In Fig. 5, I have illustrated how the sections 1' may be connected by soft wires 2' which are inserted when the rings are cast, the ends being preferably imbedded in the ring sections.

The purpose of connecting members is to hold the several sections in place relative each other during the application of the rings to the stuffing box. As shown, I prefer to make the rings with a substantially curved side 3 opposite the internal wall 4 which is of a contour to fit the rod. One side is made flat, as indicated at 5, and I also prefer to provide a portion of the opposite side flat, as indicated at 6, or reduce the curvature so that it is substantially flat. While this is not essential, yet I generally make the same in this manner.

There are also provided the desired number of cups 7, which cups may be made of rubber or rubber composition, plain asbestos or asbestos with inserts. or combinations of asbestos and rubber, asbestos duck and rubber, plain duck and rubber, cloth and rubber, leather, jute, flax with or without rubber, or such other material as may be found satisfactory for the purpose, and which may be more or less yielding and semi-resilient when compressed, or in the case of rubber, elastic as well as yielding and resilient. The same is preferably constructed with the face 9 corresponding with the face 3 of the metal ring or concaved, with the flat face 10 corresponding with the face 6, with the face 8 which is substantially flat, and with the face 12 which will cooperate with the face 5 of the metal ring and the adjacent face 8 of the adjacent cup. The bore or inner face 11 is substantially the same diameter as the rod.

I have illustrated in Fig. 1 a shaft 15, stuffing box 16 and gland 17. The several metallic rings and cups may be arranged in the stuffing box as desired, the arrangement, however, being preferably such that there will be a cup 7 at both extreme ends of the stuffing box with the intermediate rings and cups turned in the desired manner. When the cups and rings are applied, the rubber is in contact with the rod, while the ring may possibly be slightly separated prior to its contraction. When the gland 17 is tightened down, however, both the rubber and metal rings are brought into contact with the rod. Owing to the flexible connections between the sections, the rings easily contract to tightly fit the rod. Of course, it is preferred to so arrange the breaks between the sections of the rings that they break joints with those of the adjacent contacting metal ring. Where possible the rings are slipped over the rod without cutting the metallic connectors or the cups. Of course, where it is not desired to disassemble a machine for the purpose of repacking, in that case the connectors 2 or 2' at one side of the ring are broken or cut so as to permit the ring to be opened up and the cup is severed at one point so as to permit that being opened up and positioned on the rod. However, when the ends of the cup at the several points are brought together, to all intents and purposes the same is a continuous ring, as the same is molded or produced so as to closely fit the rod.

I particularly desire to so construct the cups that they bear on the rod, particularly from the time of application. In this manner leakage past the packing either along the rod or along the walls of the packing box before or after the metal rings have completely worn into a perfect seat is prevented. This is particularly desirable and important in the case of packing machines where gases or fumes may be given off due to leakage, as for example, on the rod of an ammonia machine. There are many other places where such leakage is undesirable, where the leakage of steam or water would not be so important. When the gland is tightened down the metallic rings are brought into close contact with the rod and the cups in contact not only with the rings and rod, but with the walls of the stuffing box and gland.

It will be noted by referring particularly to Figs. 1 and 2 that I generally prefer to so design the cups and rings that there is a small space between the walls 6 and 8. This allows a certain amount of play of the extreme inner edge of the cup between the face 6 of one ring and 5 of the adjacent ring. As the rod reciprocates back and forth on the power stroke, the part will seat tightly against face 5 and the rod, while upon movement of the rod in the reverse direction, the same may yield without putting any amount of friction on the rod, at the same time wiping the rod and keeping it in good condition. This, of course, not only reduces friction, but it reduces wear on the cup and at the same time where the cup is of rubber or similar material, has a tendency to prevent the cup material from setting or becoming hardened.

This type of packing is particularly desirable as the same is more or less yielding, allowing the packing to accommodate itself to the rod and at all times sealing the same as well as preventing any strain on the rod.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In combination with a reciprocatory rod, a stuffing box about said rod, a packing between said box and rod and comprising rubber cups, each having a substantially thin flanged part engaging said rod, and metal rings between the adjacent cups and fitting thereinto, said rings spaced from said cup at said flanged portion to provide a clearance thereat, whereby said flanged portions may be flexed axially of said rod.

2. In combination with a reciprocatory rod, a stuffing box about said rod, a packing between said box and rod and comprising rubber cups, each cup having a substantially thin flanged part engaging said rod, and metal rings between the adjacent cups and fitting thereinto, each metal packing ring being weakened along radial lines whereby the resilient cup will automatically expand or contract as the metal ring is moved into or out of the cup, said rings spaced from said cup at said flanged portions to provide a clearance thereat whereby said flanged portions may be flexed axially of said rod.

In testimony whereof, I have hereunto signed my name.

A. GLENN PICKETT.